US010344903B2

(12) United States Patent
Routeau et al.

(10) Patent No.: US 10,344,903 B2
(45) Date of Patent: Jul. 9, 2019

(54) PIPE, METHOD FOR REGULATING THE HEIGHT OF THE WATER IN THE PIPE, AND ASSOCIATED INSTALLATION METHOD

(71) Applicant: TECHNIP FRANCE, Courbevoie (FR)

(72) Inventors: Sylvain Routeau, Saint Cloud (FR); Philippe Bouteyre, Paris (FR); Emilie Lachaud, Villejuif (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 15/772,540

(22) PCT Filed: Nov. 3, 2016

(86) PCT No.: PCT/EP2016/076569
§ 371 (c)(1),
(2) Date: Jun. 4, 2018

(87) PCT Pub. No.: WO2017/076977
PCT Pub. Date: May 11, 2017

(65) Prior Publication Data
US 2019/0086016 A1    Mar. 21, 2019

(30) Foreign Application Priority Data
Nov. 3, 2015  (FR) ...................................... 15 60514

(51) Int. Cl.
*F16L 55/10*    (2006.01)
*F16L 1/14*    (2006.01)
(52) U.S. Cl.
CPC ............. *F16L 55/1022* (2013.01); *F16L 1/14* (2013.01)

(58) Field of Classification Search
CPC combination set(s) only.
See application file for complete search history.

(56) References Cited

U.S. PATENT DOCUMENTS

| | | | |
|---|---|---|---|
| 4,983,073 A | 1/1991 | Petty et al. | .................... 405/224 |
| 5,927,901 A * | 7/1999 | Graves | ..................... F16L 55/46 |
| | | | 138/97 |
| 10,139,014 B2 * | 11/2018 | Routeau | .................. F16L 1/163 |
| 2003/0026662 A1 * | 2/2003 | Vidal | ...................... F16L 1/123 |
| | | | 405/157 |

(Continued)

FOREIGN PATENT DOCUMENTS

WO      WO 00/53884 A1    9/2000

OTHER PUBLICATIONS

International Search Report dated Jan. 12, 2017 in corresponding PCT International Application No. PCT/EP2016/076569.
(Continued)

*Primary Examiner* — Kyle Armstrong
(74) *Attorney, Agent, or Firm* — Ostrolenk Faber LLP

(57) ABSTRACT

A pipe (14) extending between a surface end (20) and a bottom end (22) thereof, and defining an internal passage (24) ending at the bottom end (22) and at the surface end (20). A dynamic closing member (30) at the bottom end (22), which opens above a threshold pressure applied from the exterior towards the interior of the pipe (14), and closing below the threshold pressure. The threshold pressure is defined as a function of at least one parameter representing the heaving of the pipe under the effect of variation in height of the water in which the pipe extends.

10 Claims, 2 Drawing Sheets

(56) References Cited

U.S. PATENT DOCUMENTS

| | | | |
|---|---|---|---|
| 2003/0099515 A1* | 5/2003 | Giovannini | F16L 1/166 |
| | | | 405/158 |
| 2015/0063920 A1 | 3/2015 | Lovett et al. | 405/184.2 |
| 2015/0308205 A1 | 10/2015 | Arnt | |
| 2018/0073666 A1* | 3/2018 | Barnes | F16L 58/1036 |
| 2018/0135777 A1* | 5/2018 | Routeau | F16L 1/235 |

OTHER PUBLICATIONS

Written Opinion dated Jan. 12, 2017 in corresponding PCT International Application No. PCT/EP2016/076569.
Preliminary Search Report dated Apr. 27, 2016 in corresponding French Patent Application No. 15 60514.

* cited by examiner

PIPE, METHOD FOR REGULATING THE HEIGHT OF THE WATER IN THE PIPE, AND ASSOCIATED INSTALLATION METHOD

CROSS-REFERENCE TO RELATED APPLICATIONS

The present application is a 35 U.S.C. §§ 371 national phase conversion of PCT/EP2016/076569, filed Nov. 3, 2016, which claims priority of French Patent Application No. 15 60514, filed Nov. 3, 2015, the contents of which are incorporated by reference herein. The PCT International Application was published in the French language.

BACKGROUND OF THE INVENTION

The present invention relates to a pipe intended to be installed in position in a body of water from a surface that is subjected to a variation in height, the pipe extending between a surface end and a bottom end, and defining an internal passage ending at the bottom end and at the surface end, the pipe comprising a dynamic closing member at the bottom end which is adapted so as to open above a threshold pressure, applied from the exterior towards the interior of the pipe and to close below the threshold pressure.

The pipe is in particular a corrosion resistant pipeline.

It is a known practice to use a pipe whose internal surface is made of a corrosion-resistant alloy, the pipe is then referred to as a CRA pipe. CRA is an acronym for "Corrosion Resistive Alloy", as per accepted terminology. There are different types of CRA pipes. The SDPs "Super Duplex pipelines" are manufactured out of a single alloy that is corrosion resistant. The MCPs "Metallurgically clad pipelines" are pipes whose internal surface is covered with a corrosion-resistant alloy by means of a surface treatment process. The MLPs "Mechanically lined pipelines' are pipes which have an internal jacket manufactured out of a corrosion resistant alloy. The MLPs are sometimes also known as "clad pipelines". The CRA pipes may also be obtained by other means of fabrication It is known practice to use other types of corrosion resistant pipes, in particular, PLP pipes. PLP is the acronym for "Plastic Lined Pipe", for pipes having a plastic coating.

In deep water, the weight of a pipe to be laid becomes a problem on account of the limited capacities of the pipe laying equipment.

The laying of empty pipes makes it possible to limit this weight problem. But such pipe laying is difficult for several reasons. Empty pipes are not resistant to the hydrostatic pressure below a certain depth. In addition, the weight of the pipe may be useful for stabilising the pipe on the bottom or bed of the body of water during the laying operations. Indeed, the lighter the pipe, the more sensitive it is to the currents and thus has a tendency to move in the currents.

One solution is to lay a pipe that is only partially empty. When the pipe is empty up to a certain depth, it is much easier to handle and manipulate.

It is therefore necessary to control the weight of the pipe by controlling the height of the water column within the interior of the pipe.

It is a known practice to employ passive immersion units, that is to say "passive flooding unites" PFUs in order to inhibit and filter the sea water entering the pipe so as to limit corrosion. An inspection valve upstream or downstream of the PFU provides the ability to control whether or not to trigger the flooding of the pipe in a passive manner.

However, during the laying of a pipe that is partially filled from a floating surface, for example, from a pipe laying vessel, the floating surface is subjected to a variation in height. The height variation of the surface results in the moving of the pipe.

The water within the pipe is not stationary by virtue of its fluid nature. Thus when the pipe commences its dynamic movement, the water is driven by the movement of the pipe. Quickly, the free water within the interior of the pipe is driven by its inertia. The water then begins an alternating translational movement in relation to the pipe.

This dynamic movement of water that is unsynchronised with the movement of the pipe is amplified by the compressibility of the water and the pipe that may be expandable, in particular in the direction of its diameter, under the force generated by the moving water column. This complex dynamic movement may generate a standing acoustic wave.

This dynamic movement consequently has the effect of expelling the water inside the pipe through the end of the pipe located on the pipe laying vessel up to the level of the deck or beyond.

The dynamic movement of the water within the pipe is referred to as heave. Heave is a translational movement from top to bottom.

The expulsion of water due to the heave is dangerous for the people located on the pipe laying vessel. In addition, the water expelled by the heave represents the risk of damaging the equipment and materials present on the pipe laying vessel.

In addition, the heave adds complexity to the operations related to assembly or welding of the sections of the pipe on the pipe laying vessel. Similarly, the heave also renders difficult the assembly of a pipe section having a sub-sea architecture such as an ILT (In Line Tee) architecture, an FLET (Flowline End Termination) architecture or others.

Indeed, it is important to maintain the surface of the water within the interior of the pipe at a distance from the upper end of the pipe, in a manner so as to limit the humidity and the discharges of chemical products during the welding operations. The welding is particularly complex in the case of CRA pipes. Similarly, the assembly of connectors of the sections of a flexible pipe is impacted by the level of the water.

An alternative method for fabricating and laying of pipes is based on the insertion of a plug into the pipe. The insertion of a plug is, for example, used in order to avoid the expulsion of water by the end of the pipe during welding operations. However, this operation is long and laborious. It is additionally also necessary to remove the plug at the end of the installation process in order to use the pipe.

SUMMARY OF THE INVENTION

An objective of the invention is to provide a pipe that is able to be installed in position in a body of water from a surface that is subjected to a variation in height, in a manner that is safe and simple and effective.

To this end, the object of the invention relates to a pipe of the abovementioned type, characterised in that the threshold pressure is defined as a function of at least one parameter that is representative of the heave of the pipe under the effect of the height variation.

The pipe according to the invention may comprise one or more of the following characteristic features, taken into consideration in isolation or in accordance with any technically possible combination:

the threshold pressure is defined as a function of the period of the heave;

the threshold pressure is defined as a function of the amplitude of the heave;

the internal passage is partially filled with water up to a water height that is regulated by the dynamic closing member;

the threshold pressure is given by the formula:

$$Pc \geq \rho \cdot g \cdot a + \rho \cdot Ho \cdot \left(\frac{2\pi}{To}\right)^2 (w_d - a);$$

wherein:

Pc is the threshold pressure of the dynamic closing member;

$\rho$ is the density of the water of the body of water;

g is gravity;

a is the set point water height in the pipe in relation to the bottome end;

$w_d$ is the depth of the said bottom end in relation to the surface;

Ho is the height of the heave, and

To is the period of the heave.

the pipe is formed of pipe sections that are welded together;

the pipe is manufactured from a corrosion-resistant alloy based material.

The object of the invention also relates to a water regulation method for regulating the height of the water in a pipe installed in position in a body of water from a surface that is subjected to a variation in height, the pipe extending between a surface end and a bottom end and defining an internal passage ending at the bottom end and at the surface end, the pipe comprising a dynamic closing member at the bottom end which is adapted so as to open above a threshold pressure, applied from the exterior towards the interior of the pipe and to close below the threshold pressure, the method comprising of the following steps:

provision of a representative parameter that is representative of the heave of the pipe under the effect of the variation in height;

calculation of a threshold pressure as a function of the representative parameter that is representative of the heave;

adjustment of the opening of the dynamic closing member to the threshold pressure.

The water regulation method for regulating the height of the water according to the invention may comprise the following characteristic feature:

the threshold pressure (Pc) is given by the formula:

$$Pc \geq \rho \cdot g \cdot a + \rho \cdot Ho \cdot \left(\frac{2\pi}{To}\right)^2 (w_d - a)$$

Where:

Pc is the threshold pressure Pc of the dynamic closing member;

$\rho$ is the density of the water of the body of water;

g is gravity;

a is the set point water height in the pipe and in relation to the bottom end;

$w_d$ is the depth of the said bottom end in relation to the surface;

Ho is the height of the heave, and

To is the period of the heave.

The object of the invention also relates to an installation method for installing a pipe in a body of water, the pipe comprising a bottom section having a bottom end and an upper end, the pipe comprising a dynamic closing member at the bottom end, which is adapted so as to open above a threshold pressure applied from the exterior to the interior of the pipe and to close above the threshold pressure and at least a second section, the pipe installation method comprising of the following steps:

installation of a bottom section comprising the dynamic closing member in the water;

lowering of the second section into the body of water;

the height of the water being regulated in the pipe by a water regulation method as described here above in a manner so as to be at a distance away from the upper end of the bottom section.

BRIEF DESCRIPTION OF THE DRAWINGS

The invention will be better understood upon reading the description which will follow, provided solely by way of example and with reference being made to the accompanying drawings, in which.

DESCRIPTION OF EMBODIMENTS

In all the sections following here below, the terms "exterior/external" or "externally" and "interior/internal" or "internally" are generally to be understood in a radial sense in relation to a central axis A-A' of the pipe. The terms "exterior/external" are to be understood as being relatively farther away radially from the central axis A-A' and the terms "interior/internal" are to be understood as being closer radially to the central axis A-A' of the pipe. Moreover, the terms "upstream" and "downstream" are generally to be understood in relation to the normal direction of flow of a petroleum fluid. In the particular case of an injection pipeline for injecting the fluid, the fluid is injected from the top part towards the bottom part of the pipe, consequently the terms "upstream" and "downstream" should therefore be interpreted in the reverse manner relative to a normal production pipeline.

The pressures mentioned are differential pressures, unless otherwise indicated.

Figure 1:
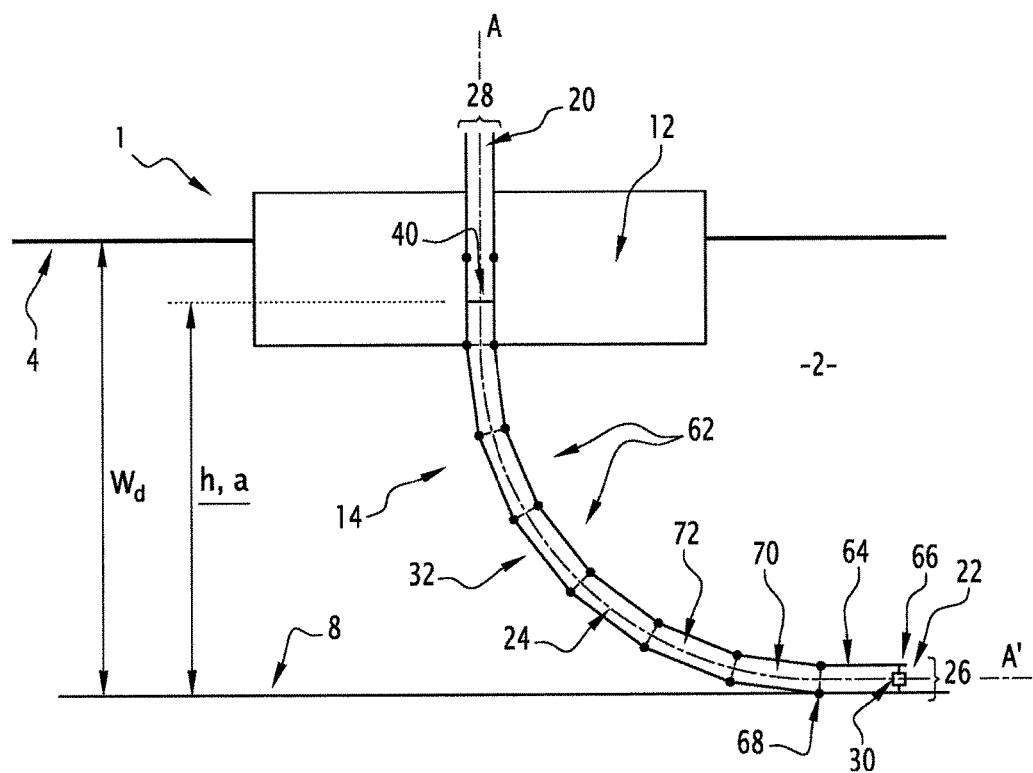
FIG. 1 is a cross sectional view of a pipe according the invention.

A pipe laying installation 1 for laying of a fluid transport pipe in a body of water 2 is partially illustrated in FIG. 1.

The pipe laying installation 1 is for example intended to be used for laying a pipe between a bottom hole assembly that is capable of collecting hydrocarbons at the bottom of the body of water 2 and a recovery assembly (not represented).

The body of water is 2, for example, a sea, a lake, or an ocean. The depth of the body of water 2 in line with the pipe laying installation 1 between the surface 4 and the bottom 8 is, for example, comprised between 50 meters and 3000 meters.

The water of the body of water 2 has a density $\rho$. For example, the water is sea water having a density of 1025 kg/m3.

Figure 2:
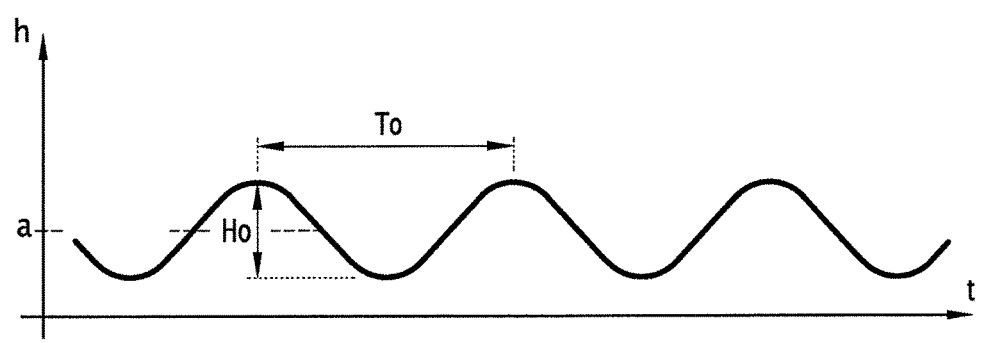
FIG. 2 is a schematic representation of the heave within the pipe.

The surface 4 of the body of water 2, is for example locally subjected to an oscillating movement which causes its level (height) to vary, such as the wave swell as illustrated in FIG. 2.

The pipe laying installation 1 comprises at least one surface assembly 12 which is advantageously floating, intended to be used for the laying of a pipe 14. In addition, the pipe laying installation 1 comprises a measurement sensor for measuring movement characteristics of the body of water 2 and a computation unit.

The pipe 14 is intended to be disposed through the body of water 2 from the surface assembly 12. The pipe 14 is intended for connecting the bottom assembly to the recovery assembly.

The surface assembly 12 is a pipe laying vessel 14. By way of a variant, the surface assembly 12 is a platform.

The surface assembly 12 is subjected to a variation in height. The variation in height of the surface assembly 12 is dependent on the wave swell.

The variation in height is for example periodic.

The variation in height of the surface assembly 12 advantageously has a magnitude ranging from 0 meters to 15 meters for periods of between 0.5 seconds and 10 minutes.

The surface assembly 12 comprises of laying equipment units for laying of the pipe 14.

The pipe laying equipment units include, for example tensioning devices and welding units. The pipe laying equipment units are capable of sequentially assembling the sections of the pipe 14 in order to enable lowering it progressively into the body of water 2.

The pipe 14 extends between a surface end 20 and a bottom end 22 along a central symmetry axis A-A'. The pipe 14 comprises a sealed external wall 32 defining an internal passage 24 that leads to a lower opening 26 at the bottom end 22 and leads to an upper opening 28 at the surface end 20. The pipe in addition includes a dynamic closing member 30 for closing off the internal passage 24 situated at the bottom end 22.

The pipe 14 has, for example, a circular transverse cross section.

The pipe 14 has an internal diameter comprised between 12 cm and 102 cm.

The pipe 14 has a length along the central axis A-A' comprised between 100 m and 50 km. The pipe 14 has, for example, a catenary shaped form along the central axis A-A'.

The pipe 14 is here a rigid metal pipe. The pipe 14 is advantageously formed of an assembly of sections. In the example, the pipe 14 is made from a corrosion-resistant alloy based material. The pipe is a CRA pipe, for example, an SDP, MCP, or MLP.

By way of a variant, the pipe 14 is a flexible pipe. By way of a variant, the pipe 14 is a hybrid pipe which comprises of at least one rigid portion and at least one flexible portion.

The pipe 14 comprises various sections 62, 64, 70 that are assembled by being joined to each other.

Each section 62, 64, 70 includes a lower end and an upper end. Each upper end of a section is adapted so as to be welded or connected to a lower end of another section 62, 64, 70.

In the example, each section 62, 64, 70 is rigid. The length of each segment 62, 64, 70 is for example comprised between 50 m and 200 m.

The pipe 14 comprises, in addition, a bottom section 64 defining a bottom end 66 and an upper end 68. The bottom section 64 contains at its bottom end 66 the dynamic closing member 30.

In one example that is not represented, at least one section is, in addition, also assembled to an equipment unit having a sub-sea architecture such as an ILT (In Line Tee) architecture, an FLET (Flowline End Termination) architecture), a collector, a sub-sea separator or others.

The surface end 20 is advantageously disposed above the level of the surface of the body of water 2 on the surface assembly 12, or in a gas volume situated under the surface 4 of the body of water 2.

In the example represented, the bottom end 22 of the pipe 14 rests on the bottom 6 of the body of water 2. By way of a variant, the bottom end 22 of the pipe 14 is disposed free in the body of water 2.

$W_d$ denotes the depth of the bottom end 22 of the pipe 14 in relation to the surface 4 of the body of water 2.

The internal passage 24 is partially filled with water up to a water height (level) $h$.

The water height $h$ is measured between the depth of the bottom end 22 and the interface 40 between the water and air in the internal passage 24 of the pipe 14.

The term "water column", is used to refer to the quantity of water within the internal passage 24 comprised between the bottom end 22 and the interface 40.

The height of the water $h$ varies as a function of the heave. The height of the water $h$ is regulated by means of the dynamic closing member 30 so as to reach the set point water height $a$ as this will be described farther here below.

The term 'heave' is used to refer to the dynamic movement of the water within the interior of the pipe 14 under the effect of the variation in height of the surface 4.

The heave has, for example, a period To and an amplitude Ho as represented in FIG. 2. FIG. 2 represents the water height $h$ that is to say the height of the interface 40 in the pipe 14 as a function of time.

In operation, the average water height $h$ for example over a period To_is equal to the set point water height $a$.

The wall 32 is sealed. The wall 32 prevents the ingress of water from the exterior of the pipe 14 into the internal passage 24.

The dynamic closing member 30 is adapted so as to open above a threshold pressure Pc in order to allow the entry of water into the internal passage 24. The opening by the dynamic closing member 30 is, for example, partial. The dynamic closing member 30 is adapted so as to close again below the threshold pressure Pc in order to prevent the ingress of water into the internal passage 24.

According to the invention, the threshold pressure Pc is applied from the exterior towards the interior of the pipe 14.

The threshold pressure Pc is defined as a function of at least one parameter that is representative of the heave of the pipe 14 under the effect of the variation in height.

For example, the threshold pressure Pc is defined as a function of the period To of the heave and/or as a function of the amplitude Of the heave Ho.

The threshold pressure Pc is, in addition advantageously defined as a function of the set point height of the water $a$.

The threshold pressure Pc is defined both as a function of the static component as well as of the heave.

The static component is the hydrostatic pressure related to the weight of the water column having the set point water height $a$.

The threshold pressure Pc is preferably defined by the formula;

$$Pc \geq \rho \cdot g \cdot a + \rho \cdot Ho \cdot \left(\frac{2\pi}{To}\right)^2 (w_d - a)$$

Where:
Pc is the threshold pressure of the closing member 30;
$\rho$ is the density of the water;

g is gravity;
a is the set point water height in the pipe 14 between the interface 40 and the bottom end 22;
$W_d$ is the depth of the bottom end 22 in relation to the surface 4 of the body of water 2;
Ho is the height of the heave; and
To is the period of the heave.

For example, the opening of the dynamic closing member 30 is thus adjusted according to the threshold pressure Pc as calculated by the computation unit.

The dynamic closing member 30 makes it possible to perform a dynamic control of the pressure in the internal passage 24 of the pipe 14. The dynamic closing member 30 thus controls the flooding of the pipe 14.

The dynamic closing member 30 is, for example, an inspection or check valve, or a flap valve. By way of a variant, the dynamic closing member 30 comprises, in addition, other hydraulic components that provide the means to improve the pressure system in accordance with a flow curve.

The calibrated pressure of the dynamic closing member 30 is adjusted and regulated by hydraulic, pneumatic, electrical and/or mechanical means.

The dynamic closing member 30 includes, for example, a calibrated spring that is capable of biasing the dynamic closing member towards a closed position. The flow passage is kept closed until such time as the pressure difference between the exterior of the pipe and the internal passage 24 is lower than the threshold pressure Pc. When the difference in pressure between the exterior of the pipe and the internal passage 24 is above the threshold pressure Pc, with the pressure on the exterior being greater than that of the internal passage 24, the dynamic closing member passes into the open position against the force generated by the spring. In this way, the dynamic closing member 30 enables the through-passage of water from the exterior into the internal passage 24 through the lower opening 26 that is partially open. The spring exerts a predetermined force that opposes the return of the liquid when the pressure differential is less than the threshold pressure Pc.

By way of a variant, the opening of the dynamic closing member 30 is controlled based on a measurement performed electronically, pneumatically or hydraulically of the difference in pressure between the exterior of the pipe 14 and the internal passage 24.

The sensor is advantageously disposed on the surface assembly 12.

The sensor makes it possible to measure the variations in height of the surface assembly 12 and/or the surface 4. For example, the sensor determines the parameters that are representative of the wave swell in real time.

By way of a variant, the sensor is disposed at a distance away from the surface assembly 12, on a buoy for example. For example, the sensor disposed at a distance away provides a database with measurements carried out each day.

The computation unit is advantageously disposed on the surface assembly 12.

The computation unit is capable of determining a representative parameter that is representative of the heave in the pipe 14 as a function of the height variation.

The computation unit is capable of determining for example the period To of the heave and/or the amplitude Of the heave Ho as a function of the height variation of the surface 4.

The amplitude of the heave Ho is for example calculated as a function of the acceleration of the surface assembly 2, as a function of the length of the pipe 14 filled with water and/or as a function of the diameter of the pipe 14. The amplitude of the heave Ho is calculated based on conventional physical models of marine hydrodynamics. The amplitude of the heave Ho and the period of the heave To depend on the amplitude and the period of the wave swell. The calculation of the amplitude Ho and the period To of the heave varies as a function of the size of the surface assembly 12, the equipment units which are disposed over the surface assembly 12 and the size of the pipe 14.

For example, the amplitude of the heave Ho is estimated based on predetermined values. For example, the amplitude of the heave Ho is estimated based on a maximum significant height, obtained from the maximum values measured over the course of a predetermined period, for example over the last 50 years or the last 100 years. By way of a variant, the amplitude of the heave Ho is estimated based on a significant mean value calculated from the measurements carried out over the course of a predetermined period, for example over the last 50 years or the last 100 years. These significant values are generally based on readings taken at sea via an on-board instrumentation disposed on one or more buoys. They can be made available on a database that is accessible internally or via the internet.

The computation unit is adapted so as to determine a threshold pressure Pc as a function of the parameter that is representative of the heave in the pipe 14. The computation unit is adapted so as to determine a threshold pressure Pc as a function of the set point height of the water a.

The forces of inertia associated with the heave are converted into the threshold pressure Pc by means of a calculation.

Moreover, the higher the threshold pressure Pc is, the greater the set point height a of the water column will be.

For example, the threshold pressure Pc is greater than 10 bar in a pipe measuring 25 cm in diameter submerged in 1500 m of water.

In a first embodiment, the threshold pressure Pc is initially determined by selecting the value obtained when the pipe 14 is resting on the bottom of the body of water 2. The dynamic closing member 30 is then adjusted to a threshold pressure Pc at the surface prior to its immersion and retains its setting during the pipe laying operation.

A water regulation method for regulating the height of the water h in a pipe 14 installed in position in a body of water 2 from a surface that is subjected to a variation in height will now be described.

A representative parameter that is representative of the heave of the pipe 14 under the effect of the variation in height is provided. For example, the sensor measures the wave swell and determines the variation in height of the surface assembly 12.

The computation unit calculates a representative parameter that is representative of the heave, for example the period of the heave and/or the amplitude of the heave as a function of the variation in height. A threshold pressure Pc is calculated as a function of the representative parameter that is representative of the heave, by the computation unit.

Once the threshold pressure Pc has been assessed by the computation unit, it is possible to compensate for the effect of the heave by means of controlling the dynamic closing member 30.

The dynamic closing member 30 is adjusted and regulated according to the threshold pressure Pc determined, on the surface assembly 12 prior to the immersion of the pipe 14. Once the threshold pressure Pc has been regulated, the pipe 14 is immersed into the body of water 2.

If the internal pressure of the pipe 14 is less than the threshold pressure Pc, the water enters into the internal passage 24 through the lower opening 26. The height of the water h rises up to the set point water height a corresponding to the height used for the calculation of the threshold pressure Pc. The volume of water in the internal passage 24 of the pipe increases. The level of the interface 40 increases until such point as the pressure within the interior of the pipe at the level of the dynamic closing member 30 is greater than or equal to the threshold pressure Pc.

When the internal pressure of the pipe is equal to the threshold pressure Pc, the height of the water h, the level of the interface 40 is at the set point height of the water a.

The dynamic closing member 30 then closes.

A pipe installation method for installation of the pipe 14 in a body of water 2 will now be described.

Initially, the sections 62, 64, 70 intended for forming the pipe are provided on the surface assembly 12.

The threshold pressure Pc is assessed by the computation unit, taking into account the heave.

The dynamic closing member 30 is adjusted and regulated according to the threshold pressure Pc, for example, on the surface assembly 12 prior to the immersion of the bottom section 66.

The lower end 66 of bottom section 64 is placed in position in the water by means of the pipe laying equipment units up to a certain depth.

The height of the water h in the pipe 14 formed by the bottom section 64 is regulated by means of the dynamic closing member 30 as previously described.

A second section 70 is then welded on to the upper end 68 of bottom section 64 by making use of the pipe laying equipment.

The height of the water h is regulated prior to the step of welding in a manner so as to be at a distance away from the upper end 68 of the bottom section 64.

Thereafter, the pipe formed by the second section 70 and the bottom section 64 is immersed far deeper into the water.

A third section 72 is welded on to the upper end of the pipe formed by the second section 70 and the bottom section 64.

The process is thus then repeated, until such point as the desired length of pipe 14 is obtained.

During the laying of the pipe 14, the bottom end 22 is initially free in the body of water 2 until such point as it comes into contact with the bottom 6 of the body of water and 5 comes to rest on the bottom 6.

In a second embodiment, the computation unit determines the amplitude Ho and the period To multiple times over the course of the laying of the pipe 14 based on the measurements from the sensor.

Advantageously after each new instance of determination of the amplitude Ho and the period To of the heave, a threshold pressure Pc is calculated by the computation unit and the dynamic closing member 30 is adjusted to the threshold pressure Pc.

For example, the computation unit is capable of determining a sequence of threshold pressure Pc based on a series of set point water heights to be adapted to the laying of the pipe.

The dynamic closing member 30 is adjusted successively to a first threshold pressure Pc corresponding, for example, to a first set point water height a, and then to a second threshold pressure Pc corresponding to a second set point water height a.

The pipe installation method for installation of the pipe 14 in a body of water 2 according to the second embodiment differs from the previously described method in that the threshold pressure Pc is determined at each time instant during the descent of the pipe 14 into the body of water 2. The method thus then comprises a plurality of adjustment steps for adjustment of the dynamic closing member 30 to the appropriate threshold pressure Pc.

The level of the threshold pressure Pc is advantageously adjusted on a dynamic closing member 30 after each step of immersion. By way of a variant, the dynamic closing member 30 is controlled on a continuous basis in order to be opened based on the threshold pressure Pc determined at each time instant. For example, the dynamic closing member 30 is adjusted manually by means of a diver, a remotely operated underwater vehicle ROV, or an autonomous underwater vehicle AUV. By way of a variant, the adjustable portion of the dynamic closing member 30 is remotely controlled, for example, from the surface assembly 12.

The control of the water level is carried out throughout the entire pipe laying sequence.

The regulation of the level of the water over the course of the immersion of the pipe 14 during installation thereof makes it possible to avoid the problems mentioned above. The operations related to the surface welding are thereby facilitated.

The use of a dynamic closing member 30 makes it possible to avoid having to pump the humid air and makes the welding operations easier.

The use of a dynamic closing member 30 makes it possible to control the flooding in the pipe 14. This thus provides the means to limit the level of the water sufficiently below the level of the surface of the body of water 2.

The water applies an increasing pressure to the bottom end 22 as a function of the depth on the exterior of the closing member 30.

The internal passage 24 is partially flooded by the water of the body of water 2 in which the pipe 14 is immersed up to a set point water height a that is dependent on the threshold pressure Pc.

The action of determining the maximum amplitude Ho of the heaving movement of the pipe 14 in order to regulate the threshold pressure Pc of the dynamic closing member 30 provides for a robust method for immersing the pipe.

The level of the interface 40 within the interior of the pipe is controlled by the dynamic closing member 30 that opens and closes regularly, taking into account the heave.

The possibility of obtaining a partially empty pipe 14 provides the ability to have a pipe 14 that is lighter but remains heavy at the bottom 8 of the body of water 2. The installation in position of the pipe 14 is thus then facilitated.

In addition, this control makes it possible to prevent the expulsion of water through the upper opening 28.

In addition, the controlling of the weight of the pipe 14 by controlling the height of the water h makes it possible to limit the degradation of the pipe laying equipment units 14.

By way of a variant, the pipe 14 comprises, in addition, a positive displacement pump. The positive displacement pump is used in addition to the dynamic closing member 30 which maintains the level of the water in the pipe 14 at a desired level.

By way of a variant, the pipe 14 is unwound in a continuous manner from the surface 4 and is lowered progressively into the body of water 2.

According to one variant, only a portion of the pipe is made of corrosion-resistant alloy.

According to one variant, the pipe 14 is a flexible pipe advantageously formed from an assembly of sections. For example, the pipe 14 is a flexible pipe with a smooth internal passage, usually referred to by the term "smooth bore" pipe or others.

The pipe 14 comprises various flexible sections that are assembled to each other. Each section has a lower end and an upper end. The length of each flexible section is for example comprised between 50 m and 50 km.

For example, the pipe comprises connectors for assembling the upper end of one section to a lower end of another section.

According to one variant, as described here above, the dynamic closing member 30 is adapted so as to open when the difference between the pressure on the exterior of the pipe 14, being applied on the dynamic closing member 30, and the pressure in the internal passage 24, being applied on the dynamic closing member 30 is greater than or equal to the threshold pressure Pc.

The dynamic closing member 30 is adapted so as to be closed when the difference between the pressure on the exterior of the pipe 14, being applied on the dynamic closing member 30, and the pressure in the internal passage 24, being applied on the dynamic closing member 30 is lower than the threshold pressure Pc.

This is in particular the case when the dynamic closing member 30 comprises a valve or a flap valve provided with a calibrated spring.

The difference in pressure being applied on either side of the closing member 30 therefore controls its opening.

More generally, the dynamic closing member 30 is adapted so as to open when the difference between the pressure on the exterior of the pipe 14, being applied at any point whatsoever situated on the exterior of the pipe 14, and the pressure in the internal passage 24, being applied at any point whatsoever of the internal passage 24, is greater than or equal to the threshold pressure Pc. Preferably, the points of application of the pressure are situated at the level of the dynamic closing member 30, on either side of the dynamic closing member 30.

The dynamic closing member 30 is thus then adapted so to be closed when this difference in pressure is less than the threshold pressure Pc.

This is in particular the case when the opening of the dynamic closing member 30 is controlled based on a measurement performed electronically, pneumatically or hydraulically of the difference in pressure between the exterior of the pipe 14 and the internal passage 24, at the level of the aforementioned points.

In all of the foregoing sections, the dynamic closing member 30 comprises at the bottom end 22 of a control means for controlling its opening and its closing. The control means is for example a mechanical member such as a calibrated spring.

By way of a variant, the control means is an actuator, in the case where the opening and closing is controlled based on a measurement performed electronically, pneumatically or hydraulically of the difference in pressure between the exterior of the pipe 14 and the internal passage 24.

The actuator is for example provided with a control unit situated at the bottom end 22, that is capable of comparing the pressure difference measured to the threshold pressure Pc and controlling/driving the actuator accordingly.

According to one variant, the control unit is offset in relation to the actuator and is connected to the actuator.

The invention claimed is:

1. A pipe intended to be installed in position in a body of water from a surface that is subjected to variation in height, the pipe being configured for extending between a surface end and a bottom end, and defining an internal passage opening at the bottom end and at the surface end;
   the pipe having an exterior and an interior;
   the pipe comprising a dynamic closing member at the bottom end which is configured to open above a threshold pressure, applied from the exterior of the pipe towards the interior of the pipe and to close below the threshold pressure;
   wherein the threshold pressure is defined as a function of at least one parameter that is representative of the heave of the pipe under an effect of the height variation.

2. The pipe according to claim 1, wherein the threshold pressure is defined as a function of a period of the heave.

3. The pipe according to claim 1, wherein the threshold pressure is defined as a function of an amplitude of the heave.

4. The pipe according to claim 1, wherein the internal passage is partially filled with water up to a water height that is regulated by the dynamic closing member.

5. The pipe according to claim 4, wherein the threshold pressure is given by the formula:

$$Pc \geq \rho \cdot g \cdot a + \rho \cdot Ho \cdot \left(\frac{2\pi}{To}\right)^2 (w_d - a)$$

wherein:
Pc is the threshold pressure of the dynamic closing member;
$\rho$ is a density of the water of the body of water;
g is gravity;
a is a set point water height in the pipe in relation to the bottom end;
$w_d$ is a depth of the bottom end in relation to the surface;
Ho is a height of the heave; and
To is a period of the heave.

6. The pipe according to claim 1, wherein the pipe is formed of pipe sections that are welded together.

7. The pipe according to claim 1, wherein the pipe is comprised of a corrosion-resistant alloy based material.

8. A regulation method for regulating a height of water in a pipe installed in position in a body of water and extending from a surface of the body of water that is subjected to a variation in height, the pipe extending between a surface end and a bottom end of the pipe, and also defining an internal passage opening at the bottom end and at the surface end;
   the pipe having an exterior and an interior;
   the pipe comprising a dynamic closing member at the bottom end which is configured to open above a threshold pressure applied from the exterior towards the interior of the pipe and to close below the threshold pressure;
   the method comprising of the following steps:
   providing a representative parameter that is representative of the heave of the pipe under the effect of the variation in height;
   calculating a threshold pressure as a function of the representative parameter that is representative of the heave;
   adjusting the opening of the dynamic closing member to the threshold pressure.

9. The regulation method according to claim 8, wherein the threshold pressure is given by the formula:

$$Pc \geq \rho \cdot g \cdot a + \rho \cdot Ho \cdot \left(\frac{2\pi}{To}\right)^2 (w_d - a)$$

wherein:

Pc is the threshold pressure of the dynamic closing member;

$\rho$ is a density of the water of the body of water;

g is gravity;

a is a set point water height in the pipe and in relation to the bottom end;

$w_d$ is a depth of the bottom end in relation to the surface;

Ho is a height of the heave; and

To is a period of the heave.

10. An installation method for installing a pipe in a body of water, the pipe comprising a bottom section having a bottom end and comprising an upper end, the pipe comprising a dynamic closing member at the bottom end, which is configured to open above a threshold pressure applied from the exterior towards the interior of the pipe and to close above the threshold pressure and at least one second section, the installation method comprising of the following steps:

installing the bottom section comprising the dynamic closing member in the water;

lowering the second section into the body of water;

regulating a height of the water in the pipe by a regulation method according to claim 8 in a manner so as to be at a distance away from the upper end of the bottom section.

* * * * *